US011915899B2

(12) United States Patent
Jiang

(10) Patent No.: US 11,915,899 B2
(45) Date of Patent: *Feb. 27, 2024

(54) INTELLIGENT MULTI-WAY SWITCH SYSTEMS

(71) Applicant: Mitchell M. Jiang, Alpharetta, GA (US)

(72) Inventor: Mitchell M. Jiang, Alpharetta, GA (US)

( * ) Notice: Subject to any disclaimer, the term of this patent is extended or adjusted under 35 U.S.C. 154(b) by 227 days.

This patent is subject to a terminal disclaimer.

(21) Appl. No.: 17/677,969

(22) Filed: Feb. 22, 2022

(65) Prior Publication Data

US 2023/0268141 A1 Aug. 24, 2023

(51) Int. Cl.
*H01H 9/56* (2006.01)

(52) U.S. Cl.
CPC ......... *H01H 9/563* (2013.01); *H01H 2300/03* (2013.01)

(58) Field of Classification Search
CPC ....................... G05B 15/02; G05B 2219/2642; H05B 47/10; H05B 47/19
USPC .......................................................... 307/112
See application file for complete search history.

(56) References Cited

U.S. PATENT DOCUMENTS

| | | | | |
|---|---|---|---|---|
| 2023/0121575 A1* | 4/2023 | Baker | ...................... | H01H 9/16 327/408 |
| 2023/0266727 A1* | 8/2023 | Jiang | ...................... | H05B 47/10 700/131 |

* cited by examiner

*Primary Examiner* — Richard Tan
(74) *Attorney, Agent, or Firm* — Ming Jiang; MM IP SERVICES LLC

(57) ABSTRACT

Present invention relates to intelligent multi-way switch system having intelligent multi-way master switch, intelligent multi-way slave switch and load. In certain embodiments, the intelligent multi-way master switch includes a DC power supply, a live wire relay, and a local switch control unit, and intelligent multi-way slave switch includes a remote switch control unit. DC power supply provides low voltage DC power to live wire relay, local and remote switch control units of the intelligent multi-way switch system. When at least one of local or remote switch control units receives switch control instructions, local or remote switch control unit receiving switch control instructions generates a negative pulse at its switch control unit first terminal, and the negative pulse is transmitted to the live wire relay. Live wire relay detects the negative pulse generated at switch control unit first terminal and turns "ON" or "OFF" the electrical power to the load.

20 Claims, 8 Drawing Sheets

INTELLIGENT MULTI-WAY SWITCH SYSTEMS

FIELD

The present disclosure generally relates to electrical switch system, and more particularly to intelligent multi-way switch systems.

BACKGROUND

Traditionally, there are many switches for lights, and household appliances. In most cases, each of the lights and household appliances is controlled by one or more switches. In FIG. 8, a conventional four-way switch system is shown. An electrical power input is connected to two three-way switches 120, one four-way switch 130, and to a load 200 in serial. The electrical power input connects to a first three-way switch 120 with a three-wire electrical cable 102, the first three-way switch 120 connects to the four-way switch 130 with a four-wire electrical cable 104, a second three-way switch 120 connects to the four-way switch 130 with the four-wire electrical cable 104, and the second three-way switch 120 connects to the load 200 with the three-wire electrical cable 102. Intelligent switches are capable of controlling lights and appliances via wireless networks, Wi-Fi networks, motion sensors, light sensors, touch panel switches, in addition to traditional push button switches. Intelligent switches become more sophisticated and more expensive to manufacture. For a multi-way switch circuit like the one shown in FIG. 8 having two identical intelligent three-way switches and an intelligent four-way switch seems a waste of resource. It is desirable to develop a master-slave switch device such that the master switch includes more sophisticated control device, and the slave switch includes only minimum device and less expensive to make, and the master-slave combination can achieve the same functionality of two intelligent three-way switches and the intelligent four-way switch.

Therefore, a heretofore unaddressed needs still exist in the art to address the aforementioned deficiencies and inadequacies.

SUMMARY

In one aspect, the present disclosure relates to an intelligent multi-way master switch. In certain embodiments, the intelligent multi-way master switch includes: a master switch first live terminal, a master switch second live terminal, a master switch traveler terminal, a master switch neutral terminal, a master switch ground terminal, a direct current (DC) power supply, a live wire relay, a local switch control unit, and a live input terminal selector. The DC power supply receives electrical power through the live input terminal selector, and provides low DC voltage to the live wire relay and the local switch control unit for the operation of the intelligent multi-way master switch. The live wire relay detects a negative pulse from the local switch control unit, and turns "ON" or "OFF" the electrical power between the master switch first live terminal and the master switch second live terminal. The local switch control unit receives switch control instructions and controls the live wire relay. The live input terminal selector includes: a first input terminal, a second input terminal, and an output terminal. When an electrical power input is connected through a three-wire electrical cable, the first input terminal is connected to the output terminal. When the electrical power input is connected through a four-wire electrical cable, the second input terminal is connected to the output terminal.

In certain embodiments, when the electrical power input is connected through the three-wire electrical cable to the master switch first live terminal, the master switch neutral terminal, and the master switch ground terminal respectively, the electrical power output is connected through the four-wire electrical cable to the master switch second live terminal, the master switch traveler terminal, the master switch neutral terminal, and the master switch ground terminal respectively.

In certain embodiments, when the electrical power input is connected through the four-wire electrical cable to the master switch second live terminal, the master switch traveler terminal, the master switch neutral terminal, and the master switch ground terminal respectively, the electrical power output is connected through the three-wire electrical cable to the master switch first live terminal, the master switch neutral terminal, and the master switch ground terminal respectively.

In certain embodiments, the DC power supply includes: a live wire terminal connected to the live wire of the electrical power input, and a neutral wire terminal connected to neutral wire of the electrical power input, and a low voltage DC output terminal, wherein the low voltage DC output terminal provides the low DC voltage to the live wire relay and the local switch control unit for the operation of the intelligent multi-way master switch.

In certain embodiments, the local switch control unit includes: a push button switch; a Wi-Fi controlled switch; a light sensor switch; a motion sensor switch; a touch panel switch; and any combination of these switch devices.

In certain embodiments, the local switch control unit includes: a switch control unit first terminal and a switch control unit second terminal, and the switch control unit first terminal is connected to the low voltage DC output terminal. When the local switch control unit receives switch control instructions, the local switch control unit generates the negative pulse at the switch control unit first terminal.

In certain embodiments, the live wire relay includes: DC control terminals having a positive DC control terminal and a negative DC control terminal, and live wire switch terminals having a first live wire terminal and a second live wire terminal. When the live wire relay is in an "ON" state, the first live wire terminal and the second live wire terminal are connected. When the live wire relay is in an "OFF" state, the first live wire terminal and the second live wire terminal are disconnected.

In certain embodiments, when the local switch control unit receives switch control instructions, and the negative pulse at the switch control unit first terminal of the local switch control unit is generated, the live wire relay detects the negative pulse generated and changes the state. When the live wire relay is in the "ON" state, the first live wire terminal and the second live wire terminal are disconnected. When the live wire relay is in the "OFF" state, the first live wire terminal and the second live wire terminal are connected.

In another aspect, the current disclosure relates to an intelligent multi-way slave switch. In certain embodiments, the intelligent multi-way slave switch includes: a slave switch first live terminal, a slave switch second live terminal, a slave switch traveler terminal, a slave switch neutral terminal, a slave switch ground terminal, and a remote switch control unit. The remote switch control unit includes: a switch control unit first terminal and a switch control unit second terminal. The switch control unit first terminal is connected to the slave switch traveler terminal to receive a low voltage DC power supply. When the remote switch control unit receives switch control instructions, the remote switch control unit generates a negative pulse at the switch control unit first terminal and the negative pulse is sent to an intelligent multi-way master switch to turn "ON" or "OFF" the electrical power supply through the slave switch traveler terminal.

In certain embodiments, when an electrical power input is connected through a three-wire electrical cable to the slave switch first live terminal, the slave switch neutral terminal, and the slave switch ground terminal respectively, the electrical power output is connected through a four-wire electrical cable to the slave switch second live terminal, the slave switch traveler terminal, the slave switch neutral terminal, and the slave switch ground terminal respectively.

In certain embodiments, when the electrical power input is connected through the four-wire electrical cable to the slave switch second live terminal, the slave switch traveler terminal, the slave switch neutral terminal, and the slave switch ground terminal respectively, the electrical power output is connected through the three-wire electrical cable to the slave switch first live terminal, the slave switch neutral terminal, and the slave switch ground terminal respectively.

In certain embodiments, the remote switch control unit includes: a push button switch; a Wi-Fi controlled switch; a light sensor switch; a motion sensor switch; a touch panel switch; and any combination of these switch devices.

In yet another aspect, the present disclosure relates to an intelligent multi-way switch system. In certain embodiments, the intelligent multi-way switch system includes: an intelligent multi-way master switch, a predetermined number of intelligent multi-way slave switches, and a load.

In certain embodiments, the intelligent multi-way master switch includes: a master switch first live terminal, a master switch second live terminal, a master switch traveler terminal, a master switch neutral terminal, a master switch ground terminal, a direct current (DC) power supply, a live wire relay, a local switch control unit, and a live input terminal selector. Each of the intelligent multi-way slave switches includes: a slave switch first live terminal, a slave switch second live terminal, a slave switch traveler terminal, a slave switch neutral terminal, a slave switch ground terminal, and a remote switch control unit.

In certain embodiments, the load includes: a load live terminal, a load neutral terminal, and a load ground terminal. The intelligent multi-way switch system controls an electrical power supply to the load. In certain embodiments, when the intelligent multi-way switch system is installed to replace an existing multi-way switch system, the intelligent multi-way master switch, the intelligent multi-way slave switches, and the load can be connected in serial. In other embodiments, when the intelligent multi-way switch system is installed in a new structure, the intelligent multi-way master switch, the intelligent multi-way slave switches, and the load can be arranged in a star shape where the intelligent multi-way master switch and the load are located close by and the intelligent multi-way slave switches may be placed in different locations. The DC power supply provides low voltage DC power to the live wire relay, the local switch control unit of the intelligent multi-way master switch, and the remote switch control units of the intelligent multi-way slave switches for the operation of the intelligent multi-way switch system.

In certain embodiments, the placement of the intelligent multi-way master switch is flexible. In one embodiment, the intelligent multi-way master switch may be directly connected to the electrical power input. In another embodiment, the intelligent multi-way master switch may be directly connected to the load. In certain embodiments, one or more intelligent multi-way slave switches may be connected to the electrical power input, followed by the intelligent multi-way master switch, one or more intelligent multi-way slave switches may be placed between the intelligent multi-way master switch and the load.

In certain embodiments, the intelligent multi-way master switch connects to the electrical power input through a three-wire electrical cable; one or more intelligent multi-way slave switches connect to the intelligent multi-way master switch through the four-wire electrical cables; the load connects to the last intelligent multi-way slave switch of the one or more intelligent multi-way slave switches through the three-wire electrical cable.

In certain embodiments, a first intelligent multi-way slave switches connects to the electrical power input through the three-wire electrical cable; the intelligent multi-way master switch connects to one or more intelligent multi-way slave switches through the four-wire electrical cable; and the load connects to the intelligent multi-way master switch through the three-wire electrical cable.

In certain embodiments, a first intelligent multi-way slave switches connects to the electrical power input through the three-wire electrical cable; the intelligent multi-way master switch connects to one or more intelligent multi-way slave switches through the four-wire electrical cable; one or more intelligent multi-way slave switches connects to the intelligent multi-way master switch through the four-wire electrical cable, and the load connects to the last of the one or more intelligent multi-way slave switches through the three-wire electrical cable.

In certain embodiments, the DC power supply includes: a live wire terminal connected to the live wire of the electrical power input, a neutral wire terminal connected to neutral wire of the electrical power input, and a low voltage DC output terminal. The low voltage DC output terminal provides the low DC voltage to the live wire relay, the local switch control unit of the intelligent multi-way master switch, the remote switch control units of the intelligent multi-way slave switches for the operation of the intelligent multi-way switch system.

In certain embodiments, when at least one of the local switch control unit of the intelligent multi-way master switch and the remote switch control units of the intelligent multi-way slave switches receives switch control instructions, the local switch control unit or the remote switch control unit that receives the switch control instructions generates a negative pulse at the switch control unit first terminal, and the live wire relay detects the negative pulse generated at the switch control unit first terminal and turns "ON" or "OFF" the electrical power to the load.

In certain embodiments, the live wire relay includes: DC control terminals having a positive DC control terminal and a negative DC control terminal, and live wire switch terminals having a first live wire terminal and a second live wire terminal. When the live wire relay is in an "ON" state, the first live wire terminal and the second live wire terminal are connected, and when the live wire relay is in an "OFF" state, the first live wire terminal and the second live wire terminal are disconnected.

In certain embodiments, when at least one of the local switch control unit of the intelligent multi-way master switch and the remote switch control units of the intelligent multi-way slave switches receives switch control instructions, and the negative pulse at the switch control unit first terminal is generated, the live wire relay detects the negative pulse generated and changes the state. When the live wire relay is in the "ON" state, the first live wire terminal and the second live wire terminal are disconnected. When the live wire relay is in the "OFF" state, the first live wire terminal and the second live wire terminal are connected.

BRIEF DESCRIPTION OF THE DRAWINGS

The accompanying drawings illustrate one or more embodiments of the present disclosure, and features and benefits thereof, and together with the written description, serve to explain the principles of the present invention. Wherever possible, the same reference numbers are used throughout the drawings to refer to the same or like elements of an embodiment, and wherein.

DETAILED DESCRIPTION

Figure 1:
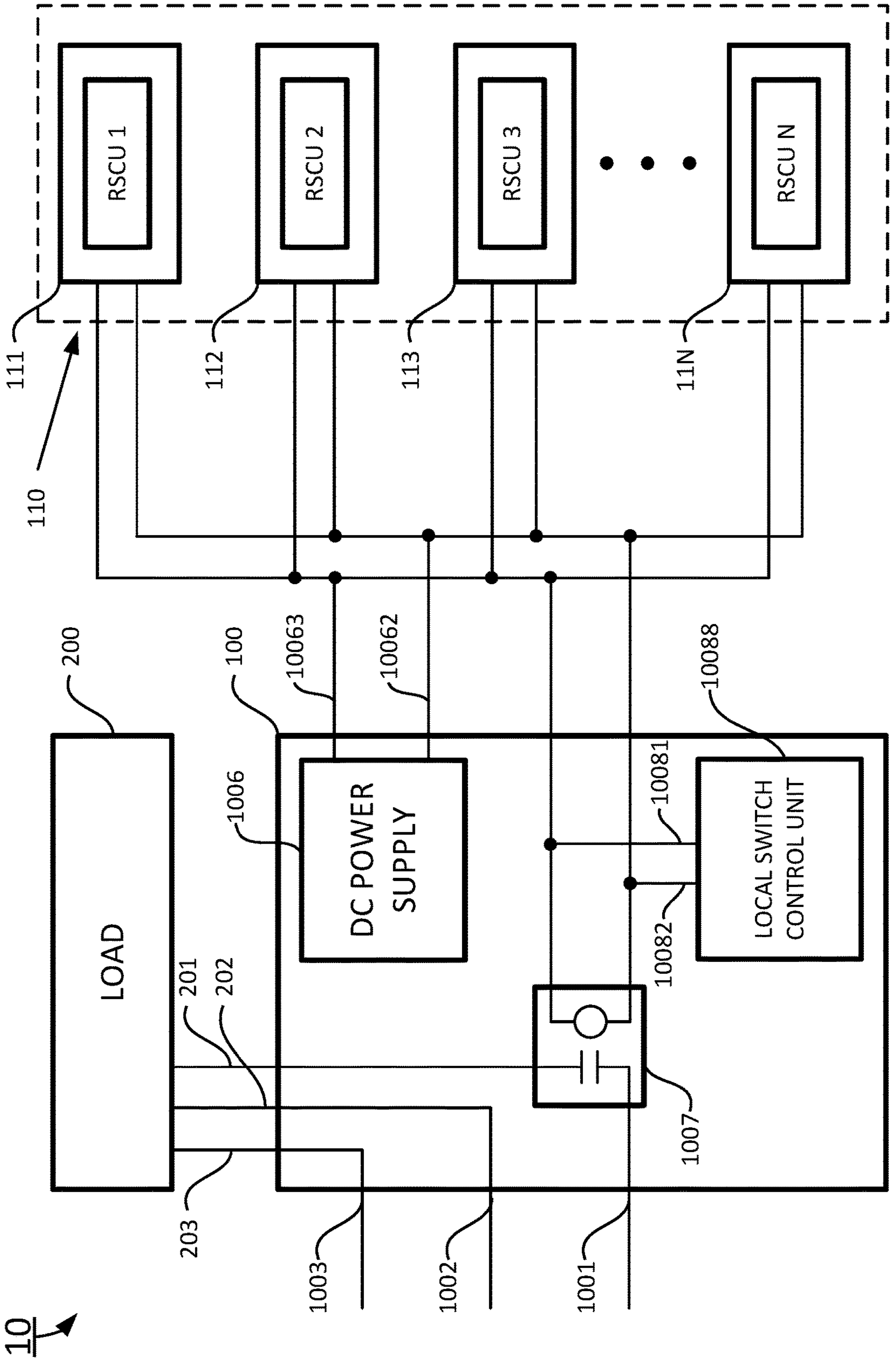
FIG. 1 schematically shows an intelligent multi-way switch system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

The apparatuses and methods described herein may be implemented by one or more computer programs executed by one or more processors. The computer programs include processor-executable instructions that are stored on a non-transitory tangible computer readable medium. The computer programs may also include stored data.

Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Figure 2:
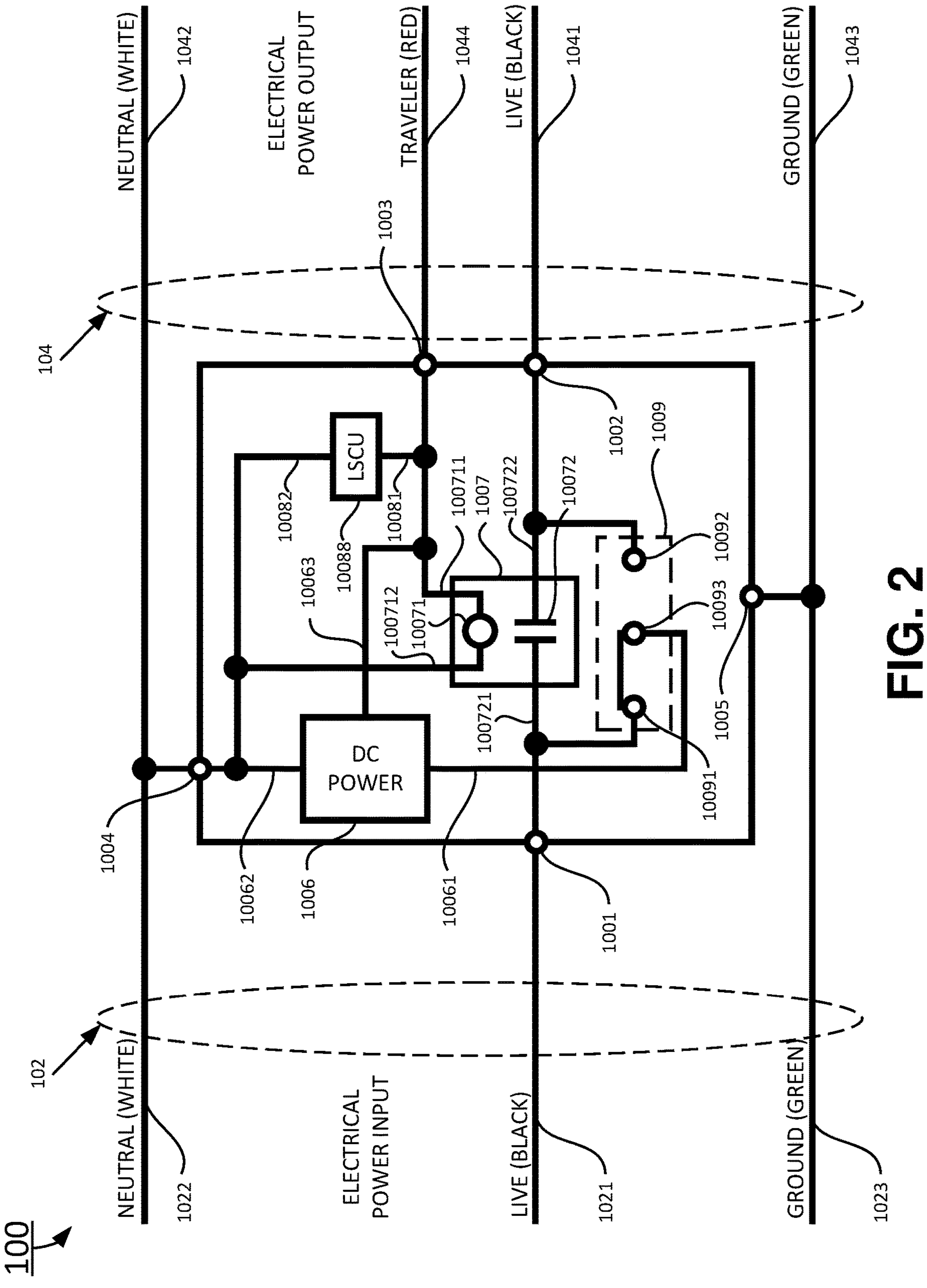
FIG. 2 schematically shows an intelligent multi-way master switch according to one embodiment of the present disclosure.

In one aspect, the present disclosure relates to an intelligent multi-way master switch 100. In one embodiment, as shown in FIG. 2, the intelligent multi-way master switch 100 is used in a place of the first three-way switch 120 shown in FIG. 8. An electrical power input is connected to the intelligent multi-way master switch 100 with a three-wire electrical cable 102. An electrical power output is connected to an intelligent multi-way slave switch 110 with a four-wire electrical cable 104.

Figure 3:
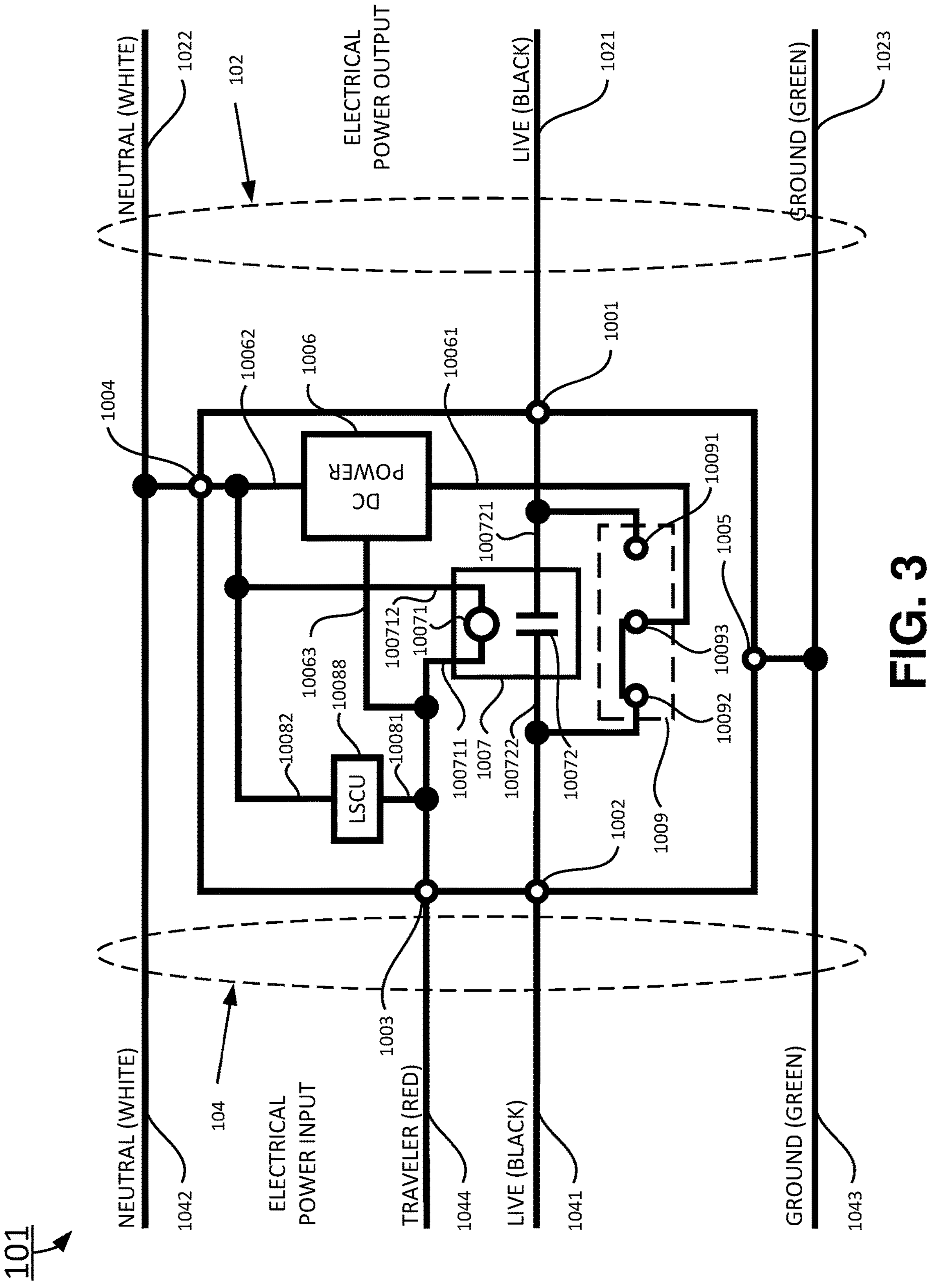
FIG. 3 schematically shows another intelligent multi-way master switch according to another embodiment of the present disclosure.
Figure 8:
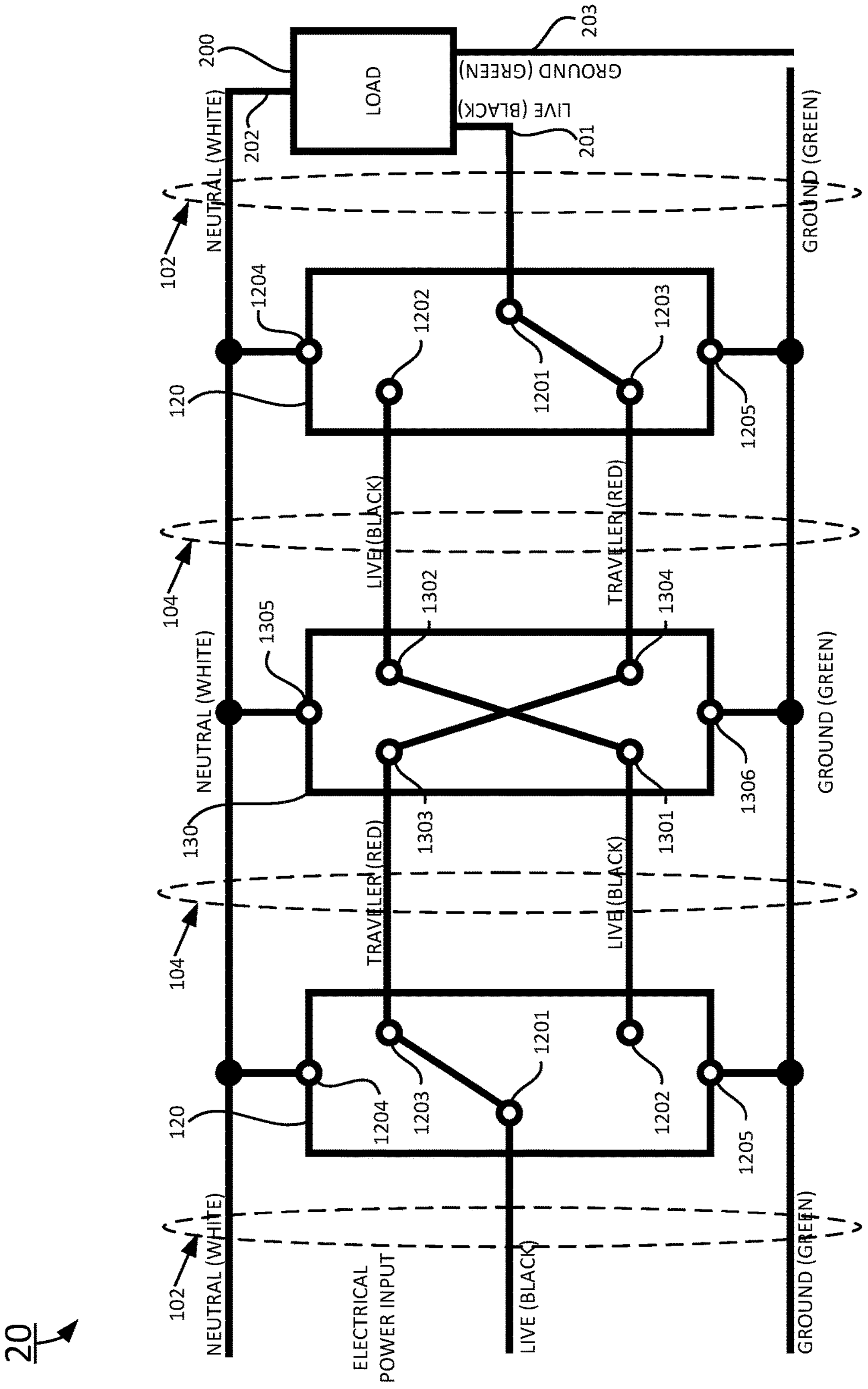
FIG. 8 (RELATED ART)
FIG. 8 schematically shows a conventional four-way switch system.

In another embodiment, as shown in FIG. 3, the intelligent multi-way master switch 100 is used in a place of the second three-way switch 120 shown in FIG. 8. The electrical power input is connected to the intelligent multi-way master switch 100 with the four-wire electrical cable 104. The electrical power output is connected to a load 200 with a three-wire electrical cable 102. The three-wire electrical cable 102 includes: the live wire (black) 1021, the neutral wire (white) 1022, and the ground wire (green) 1023.

When the intelligent multi-way master switch 100 is used to replace and retro-fit an existing multi-way switch circuit, it is important that the intelligent multi-way master switch 100 may be used to replace any one of the first and the second three-way switches 120, and the four-way switch as shown in FIG. 8, without extensive examination of the existing multi-way switch circuit.

In certain embodiments, the intelligent multi-way master switch 100 includes: a master switch first live terminal 1001, a master switch second live terminal 1002, a master switch traveler terminal 1003, a master switch neutral terminal 1004, a master switch ground terminal 1005, a direct current (DC) power supply 1006, a live wire relay 1007, a local switch control unit 10088, and a live input terminal selector 1009. The DC power supply 1006 receives electrical power through the live input terminal selector 1009, and provides low DC voltage to the live wire relay 1007 and the local switch control unit 10088 for the operation of the intelligent multi-way master switch 100. The live wire relay 1007 detects a negative pulse from the local switch control unit 10088, and turns “ON” or “OFF” the electrical power between the master switch first live terminal 1001 and the master switch second live terminal 1002. The local switch control unit 10088 receives switch control instructions and controls the live wire relay 1007.

In certain embodiments, the live input terminal selector 1009 includes: a first input terminal 10091, a second input terminal 10092, and an output terminal 10093. When an electrical power input is connected through a three-wire electrical cable 102, the first input terminal 10091 is connected to the output terminal 10093. When the electrical power input is connected through a four-wire electrical cable 104, the second input terminal 10092 is connected to the output terminal 10093.

In certain embodiments, as shown in FIG. 2, when the electrical power input is connected through the three-wire electrical cable 102 to the master switch first live terminal 1001, the master switch neutral terminal 1004, and the master switch ground terminal 1005 respectively, the electrical power output is connected through the four-wire electrical cable 104 to the master switch second live terminal 1002, the master switch traveler terminal 1003, the master switch neutral terminal 1004, and the master switch ground terminal 1005 respectively.

In certain embodiments, as shown in FIG. 3, when the electrical power input is connected through the four-wire electrical cable 104 to the master switch second live terminal 1002, the master switch traveler terminal 1003, the master switch neutral terminal 1004, and the master switch ground terminal 1005 respectively, the electrical power output is connected through the three-wire electrical cable 102 to the master switch first live terminal 1001, the master switch neutral terminal 1004, and the master switch ground terminal 1005 respectively.

In certain embodiments, as shown in FIG. 2 and FIG. 3, the DC power supply 1006 includes: a live wire terminal 10061 connected to the live wire of the electrical power input, and a neutral wire terminal 10062 connected to neutral wire of the electrical power input, and a low voltage DC output terminal 10063. The low voltage DC output terminal 10063 provides the low DC voltage to the live wire relay 1007 and the local switch control unit 10088 for the operation of the intelligent multi-way master switch 100. In certain embodiments, the low voltage DC includes: 3.5V DC, 5.0V DC, 12V DC, 18V DC, and 24V DC.

In certain embodiments, the local switch control unit 10088 is a push button switch, and when a user presses the push button, the push button switch generates a negative pulse and the negative pulse is transmitted to the live wire relay 1007 over the low voltage DC output terminal 10063.

In certain embodiments, the local switch control unit 10088 is a Wi-Fi controlled switch. The user uses an APP on a smart phone to send a control instruction to the Wi-Fi controlled switch over a communication network or a Wi-Fi area network, and the Wi-Fi controlled switch generates the negative pulse and the negative pulse is transmitted to the live wire relay 1007 over the low voltage DC output terminal 10063.

In certain embodiments, the local switch control unit 10088 is a light sensor switch. When light intensity at the light sensor switch reaches a predetermined level, the light sensor switch generates the negative pulse and the negative pulse is transmitted to the live wire relay 1007 over the low voltage DC output terminal 10063.

In certain embodiments, the local switch control unit 10088 is a motion sensor switch. When one or more people enter the space around the motion sensor switch, the motion sensor switch detects the motion and generates the negative pulse. The negative pulse is transmitted to the live wire relay 1007 over the low voltage DC output terminal 10063.

In certain embodiments, the local switch control unit 10088 is a touch panel switch. When the user touches the touch panel switch, the touch panel switch generates the negative pulse. The negative pulse is transmitted to the live wire relay 1007 over the low voltage DC output terminal 10063.

In certain embodiments, as shown in FIG. 2 and FIG. 3, the local switch control unit 10088 includes: a switch control unit first terminal 10081 and a switch control unit second terminal 10082. The switch control unit first terminal 10081 is connected to the low voltage DC output terminal 10063 to receive a low voltage DC power supply. When the local switch control unit 10088 receives switch control instructions, the local switch control unit 10088 generates the negative pulse at the switch control unit first terminal 10081.

In certain embodiments, the live wire relay 1007 includes: DC control terminals 10071 and live wire switch terminals 10072. The DC control terminals 10071 includes a positive DC control terminal 100711 and a negative DC control terminal 100712. The live wire switch terminals 10072 includes a first live wire terminal 100721 and a second live wire terminal 100722. When the live wire relay 1007 is in an “ON” state, the first live wire terminal 100721 and the second live wire terminal 100722 are connected. When the live wire relay 1007 is in an “OFF” state, the first live wire terminal 100721 and the second live wire terminal 100722 are disconnected.

In certain embodiments, when the local switch control unit 10088 receives switch control instructions, and the negative pulse at the switch control unit first terminal 10081 of the local switch control unit 10088 is generated, the live wire relay 1007 detects the negative pulse generated and changes the state. When the live wire relay 1007 is in the “ON” state, the first live wire terminal 100721 and the second live wire terminal 100722 are then disconnected.

When the live wire relay 1007 is in the "OFF" state, the first live wire terminal 100721 and the second live wire terminal 100722 are then connected.

In another aspect, as shown in FIG. 3, the current disclosure relates to an intelligent multi-way slave switch 110. In certain embodiments, the intelligent multi-way slave switch 110 includes: a slave switch first live terminal 1101, a slave switch second live terminal 1102, a slave switch traveler terminal 1103, a slave switch neutral terminal 1104, a slave switch ground terminal 1105, and a remote switch control unit 10089. The remote switch control unit 10089 includes: a switch control unit first terminal 10081 and a switch control unit second terminal 10082. The switch control unit first terminal 10081 is connected to the slave switch traveler terminal 1103 to receive a low voltage DC power supply. When the remote switch control unit 10089 receives switch control instructions, the remote switch control unit 10089 generates a negative pulse at its switch control unit first terminal 10081 and the negative pulse is sent to an intelligent multi-way master switch 100 to turn "ON" or "OFF" the electrical power supply through the slave switch traveler terminal 1103.

In certain embodiments, as shown FIG. 3, when an electrical power input is connected through a three-wire electrical cable 102 to the slave switch first live terminal 1101, the slave switch neutral terminal 1104, and the slave switch ground terminal 1105 respectively, an electrical power output is connected through a four-wire electrical cable 104 to the slave switch second live terminal 1102, the slave switch traveler terminal 1103, the slave switch neutral terminal 1104, and the slave switch ground terminal 1105 respectively.

In certain embodiments, as shown FIG. 3, when the electrical power input is connected through the four-wire electrical cable 104 to the slave switch second live terminal 1102, the slave switch traveler terminal 1103, the slave switch neutral terminal 1104, and the slave switch ground terminal 1105 respectively, the electrical power output is connected through the three-wire electrical cable 102 to the slave switch first live terminal 1101, the slave switch neutral terminal 1104, and the slave switch ground terminal 1105 respectively.

In certain embodiments, the remote switch control unit 10089 includes: a push button switch; a Wi-Fi controlled switch; a light sensor switch; a motion sensor switch; a touch panel switch; and any combination of these switch devices.

In yet another aspect, the present disclosure relates to an intelligent multi-way switch system 10. In certain embodiments, as shown in FIG. 1, and FIGS. 5-7, the intelligent multi-way switch system 10 includes: an intelligent multi-way master switch 100, a predetermined number N intelligent multi-way slave switches 110, and a load 200.

In certain embodiments, as shown in FIG. 2 and FIG. 3, the intelligent multi-way master switch 100 includes: a master switch first live terminal 1001, a master switch second live terminal 1002, a master switch traveler terminal 1003, a master switch neutral terminal 1004, a master switch ground terminal 1005, a direct current (DC) power supply 1006, a live wire relay 1007, a local switch control unit 10088, and a live input terminal selector 1009.

Figure 4:
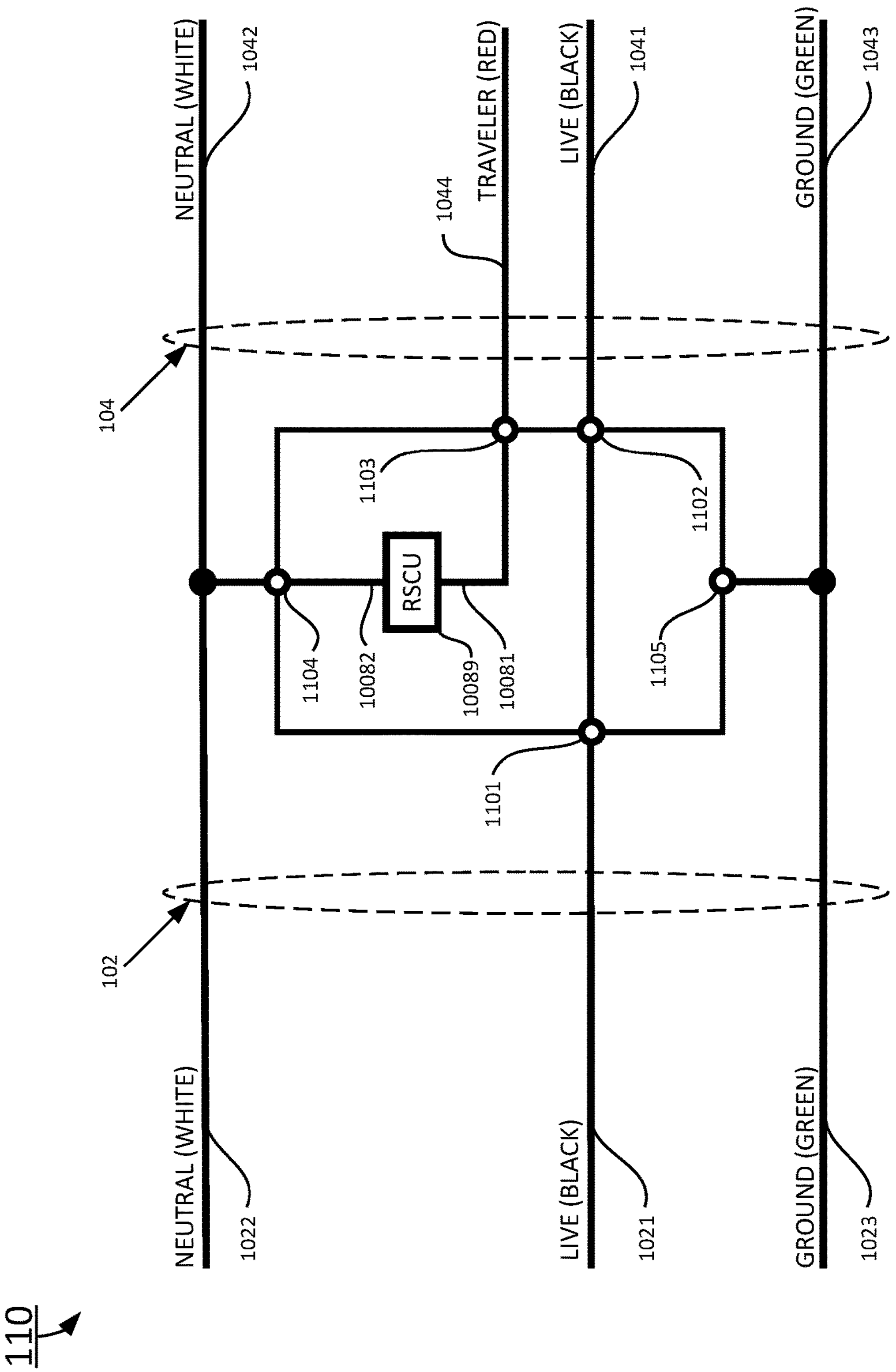
FIG. 4 schematically shows an intelligent multi-way slave switch according to certain embodiments of the present disclosure.

In certain embodiments, as shown in FIG. 4, each of the intelligent multi-way slave switches 110 includes: a slave switch first live terminal 1101, a slave switch second live terminal 1102, a slave switch traveler terminal 1103, a slave switch neutral terminal 1104, a slave switch ground terminal 1105, and a remote switch control unit 10089.

In certain embodiments, the load 200 includes: a load live terminal 201, a load neutral terminal 202, and a load ground terminal 203. The intelligent multi-way switch system 10 controls an electrical power input to the load 200. In certain embodiments, the load 200 includes: electrical appliances, lights, fans, alarm systems, air conditioners, washing machines, dishwashers, refrigerators, and other household electrical devices.

Figure 5:
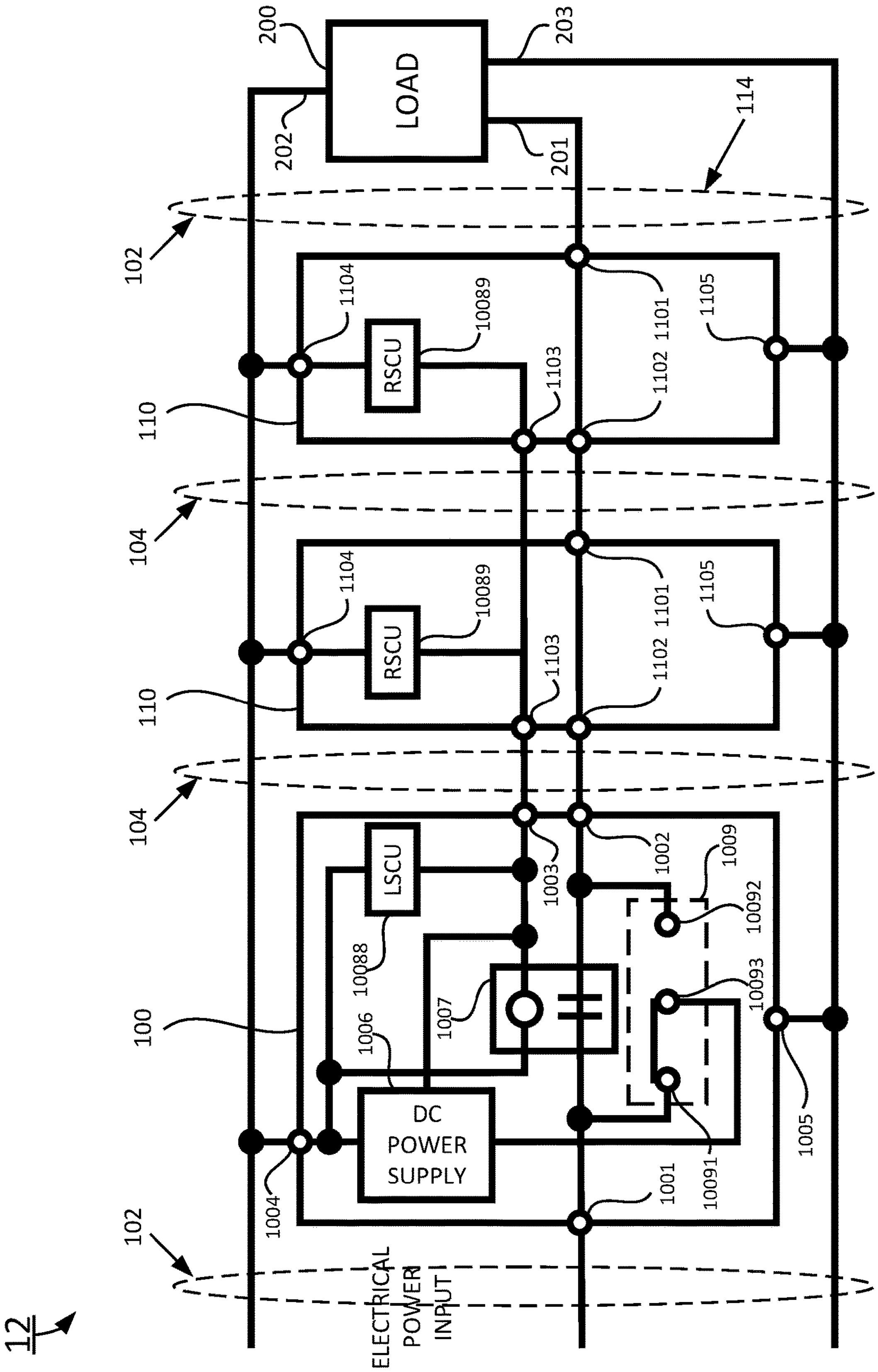
FIG. 5 shows an exemplary intelligent multi-way switch system according to one embodiment of the present disclosure.
Figure 6:
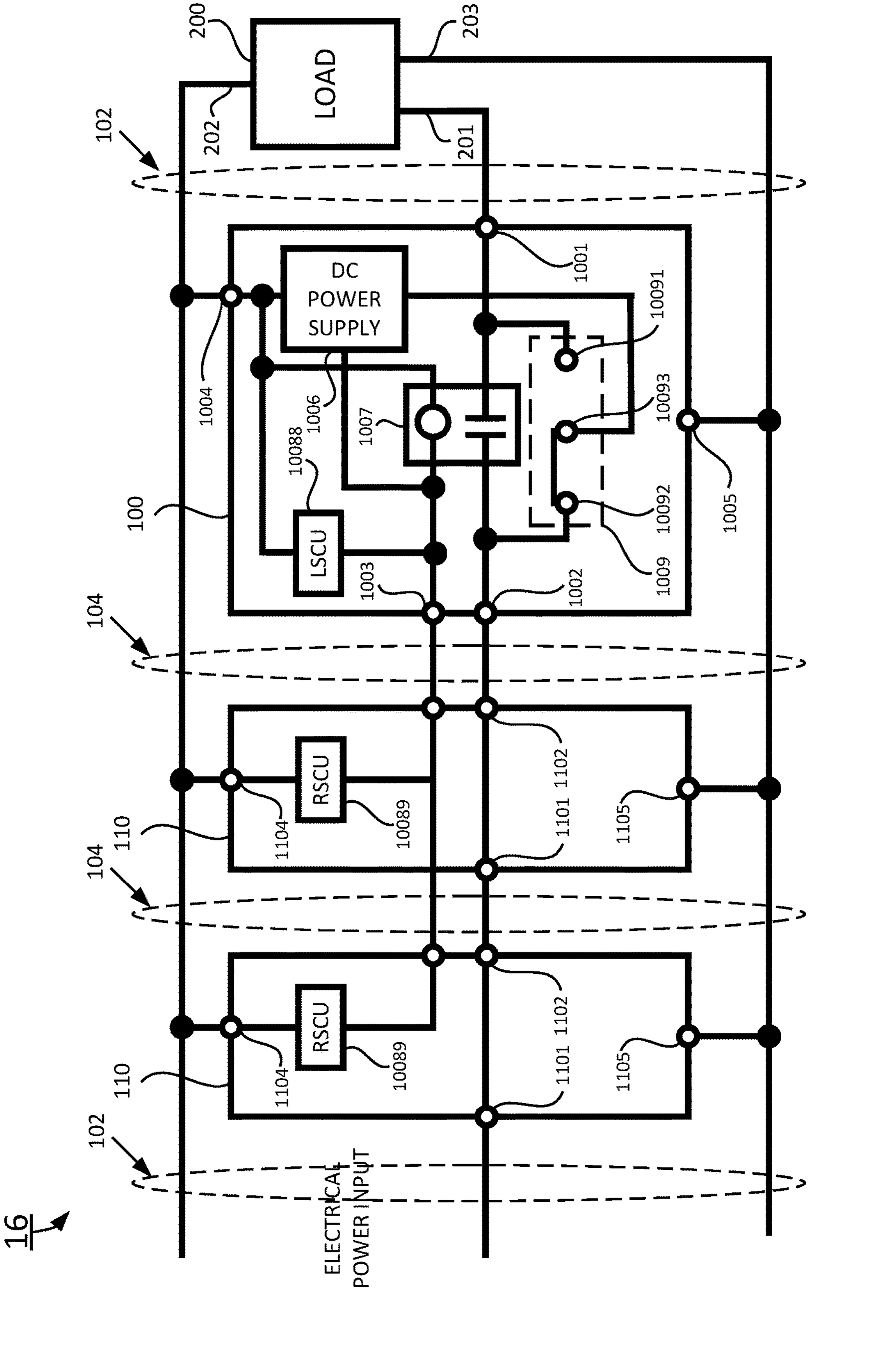
FIG. 6 shows another exemplary intelligent multi-way switch system according to another embodiment of the present disclosure.
Figure 7:
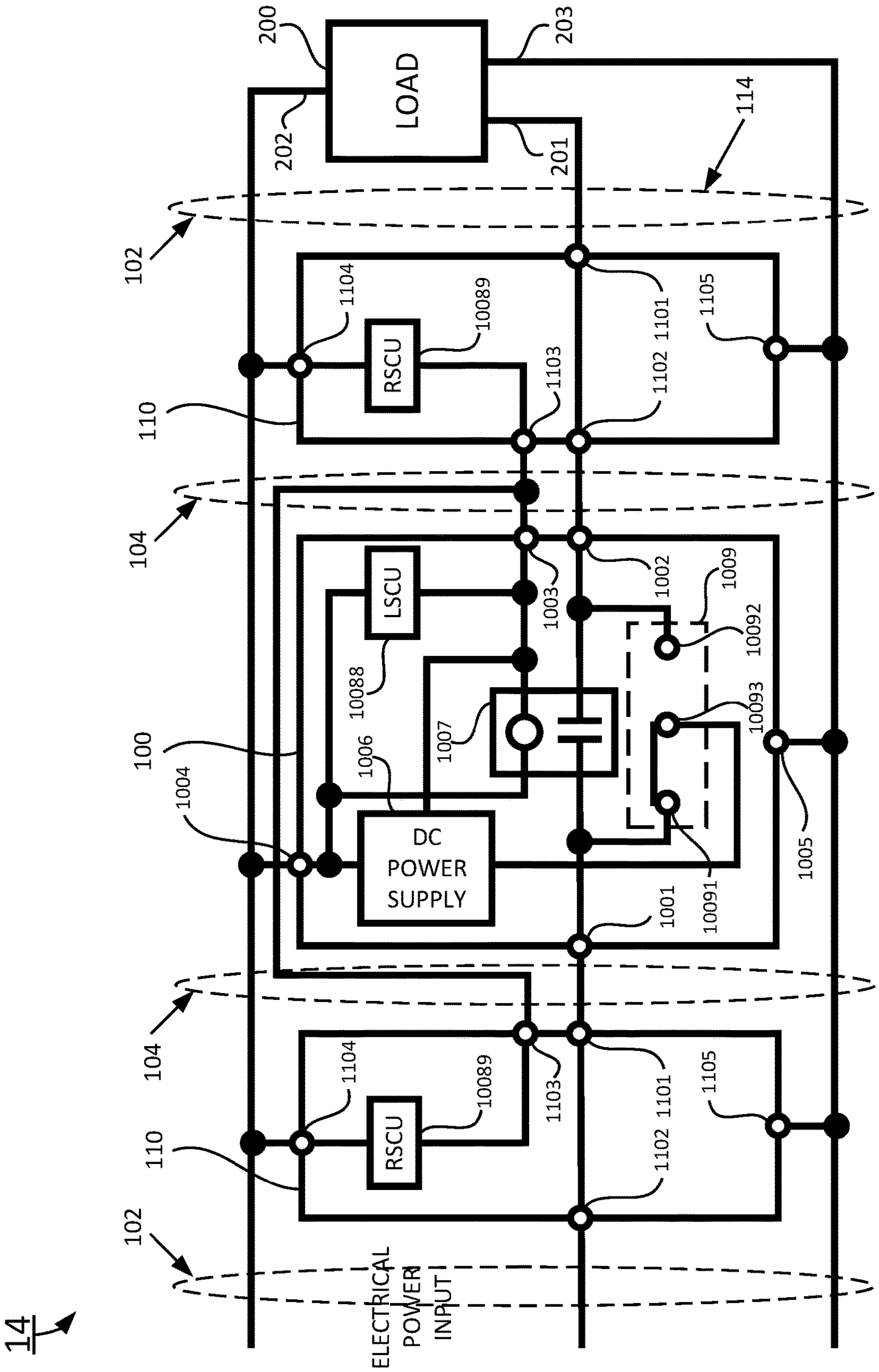
FIG. 7 shows yet another exemplary intelligent multi-way switch system according to yet another embodiment of the present disclosure.

In certain embodiments, as shown in FIGS. 5-7, when the intelligent multi-way switch system 10 is installed to replace and retro-fit an existing multi-way switch system, the intelligent multi-way master switch 100, the intelligent multi-way slave switches 110, and the load 200 can be connected in serial. In other embodiments, as shown in FIG. 1, when the intelligent multi-way switch system 10 is installed in a new structure, the intelligent multi-way master switch 100, the intelligent multi-way slave switches 110, and the load 200 can be connected in parallel and arranged in a star shape where the intelligent multi-way master switch 100 and the load 200 are located close by and the intelligent multi-way slave switches 110 may be placed in different locations. The DC power supply 1006 provides low voltage DC power to the live wire relay 1007, the local switch control unit 10088 of the intelligent multi-way master switch 100, and the remote switch control units 10089 of the intelligent multi-way slave switches 110 for the operation of the intelligent multi-way switch system 10.

In certain embodiments, the placement of the intelligent multi-way master switch 100 is flexible. In one embodiment, the intelligent multi-way master switch 100 may be directly connected to the electrical power input. In another embodiment, the intelligent multi-way master switch 100 may be directly connected to the load 200. In certain embodiments, one or more intelligent multi-way slave switches 110 may be connected to the electrical power input, followed by the intelligent multi-way master switch 100, and one or more intelligent multi-way slave switches 110 may be placed between the intelligent multi-way master switch 100 and the load 200.

In certain embodiments, as shown in FIG. 5, the intelligent multi-way master switch 100 connects to the electrical power input through a three-wire electrical cable 102. One or more intelligent multi-way slave switches 110 connect to the intelligent multi-way master switch 100 through the four-wire electrical cables 104. The load 200 connects to the last intelligent multi-way slave switch 110 of the one or more intelligent multi-way slave switches 110 through the three-wire electrical cable 102.

In certain embodiments, as shown in FIG. 6, a first intelligent multi-way slave switches 110 connects to the electrical power input through the three-wire electrical cable 102. The intelligent multi-way master switch 100 connects to one or more intelligent multi-way slave switches 110 through the four-wire electrical cable 104. The load 200 connects to the intelligent multi-way master switch 100 through the three-wire electrical cable 102.

In certain embodiments, as shown in FIG. 7, a first intelligent multi-way slave switches 110 connects to the electrical power input through the three-wire electrical cable 102. The intelligent multi-way master switch 100 connects to one or more intelligent multi-way slave switches 110 through the four-wire electrical cable 104. One or more intelligent multi-way slave switches 110 connects to the intelligent multi-way master switch 100 through the four-wire electrical cable 104, and the load 200 connects to the last of the one or more intelligent multi-way slave switches 110 through the three-wire electrical cable 102.

In certain embodiments, the DC power supply 1006 includes: a live wire terminal 10061 connected to the live wire of the electrical power input, a neutral wire terminal 10062 connected to neutral wire of the electrical power input, and a low voltage DC output terminal 10063. The low voltage DC output terminal 10063 provides the low DC voltage to the live wire relay 1007, the local switch control unit 10088 of the intelligent multi-way master switch 100, the remote switch control units 10089 of the intelligent multi-way slave switches 110 for the operation of the intelligent multi-way switch system 10. In certain embodiments, the low voltage DC includes: 3.5V DC, 5.0V DC, 12V DC, 18V DC, and 24V DC.

The local switch control unit 10088 of the intelligent multi-way master switch 100 and the remote switch control units 10089 of the intelligent multi-way slave switch 110 are collectively represented as a switch control unit 1008, for brevity.

In certain embodiments, the switch control unit 1008 is a push button switch, and when a user presses the push button, the push button switch generates a negative pulse and the negative pulse is transmitted to the live wire relay 1007 over the low voltage DC output terminal 10063.

In certain embodiments, the switch control unit 1008 is a Wi-Fi controlled switch. The user uses an APP on a smart phone to send a control instruction to the Wi-Fi controlled switch over a communication network or a Wi-Fi area network, and the Wi-Fi controlled switch generates the negative pulse and the negative pulse is transmitted to the live wire relay 1007 over the low voltage DC output terminal 10063.

In certain embodiments, the switch control unit 1008 is a light sensor switch. When light intensity at the light sensor switch reaches a predetermined level, the light sensor switch generates the negative pulse and the negative pulse is transmitted to the live wire relay 1007 over the low voltage DC output terminal 10063.

In certain embodiments, the switch control unit 1008 is a motion sensor switch. When one or more people enter the space around the motion sensor switch, the motion sensor switch detects the motion and generates the negative pulse. The negative pulse is transmitted to the live wire relay 1007 over the low voltage DC output terminal 10063.

In certain embodiments, the switch control unit 1008 is a touch panel switch. When the user touches the touch panel switch, the touch panel switch generates the negative pulse. The negative pulse is transmitted to the live wire relay 1007 over the low voltage DC output terminal 10063.

In certain embodiments, when at least one of the local switch control unit 10088 of the intelligent multi-way master switch 100 and the remote switch control units 10089 of the intelligent multi-way slave switches 110 receives switch control instructions, the local switch control unit 10088 or the remote switch control unit 10089 that receives the switch control instructions generates a negative pulse at the switch control unit first terminal 10081. The live wire relay 1007 detects the negative pulse generated at the switch control unit first terminal 10081 and turns "ON" or "OFF" the electrical power to the load 200.

In certain embodiments, the live wire relay 1007 includes: DC control terminals 10071 and live wire switch terminals 10072. The DC control terminals 10071 includes a positive DC control terminal 100711 and a negative DC control terminal 100712. The live wire switch terminals 10072 includes a first live wire terminal 100721 and a second live wire terminal 100722. When the live wire relay 1007 is in an "ON" state, the first live wire terminal 100721 and the second live wire terminal 100722 are connected.

In certain embodiments, when at least one of the local switch control unit 10088 of the intelligent multi-way master switch 100 and the remote switch control units 10089 of the intelligent multi-way slave switches 110 receives switch control instructions, and the negative pulse at the switch control unit first terminal 10081 is generated, the live wire relay 1007 detects the negative pulse generated and changes the state. When the live wire relay 1007 is in the "ON" state, the first live wire terminal 100721 and the second live wire terminal 100722 are disconnected. When the live wire relay 1007 is in the "OFF" state, the first live wire terminal 100721 and the second live wire terminal 100722 are connected.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. An intelligent multi-way master switch, comprising:

a master switch first live terminal, a master switch second live terminal, a master switch traveler terminal, a master switch neutral terminal, and a master switch ground terminal;

a local switch control unit, wherein the local switch control unit receives one or more switch control instructions and controls a live wire relay; and the live wire relay, wherein the live wire relay detects a negative pulse from the local switch control unit, and turns "ON" or "OFF" an electrical power between the master switch first live terminal and the master switch second live terminal;

a live input terminal selector, wherein the live input terminal selector comprises a first input terminal, a second input terminal, and an output terminal, wherein when an electrical power input is connected through a three-wire electrical cable, the first input terminal is connected to the output terminal, and when the electrical power input is connected through a four-wire electrical cable, the second input terminal is connected to the output terminal, and a direct current (DC) power supply, wherein the DC power supply receives the electrical power through the live input terminal selector, and provides a low DC voltage to the live wire relay and the local switch control unit for an operation of the intelligent multi-way master switch.

2. The intelligent multi-way master switch according to claim 1, wherein when the electrical power input is connected through the three-wire electrical cable to the master switch first live terminal, the master switch neutral terminal, and the master switch ground terminal respectively, an electrical power output is connected through the four-wire electrical cable to the master switch second live terminal, the master switch traveler terminal, the master switch neutral terminal, and the master switch ground terminal respectively.

3. The intelligent multi-way master switch according to claim 2, wherein when the electrical power input is connected through the four-wire electrical cable to the master switch second live terminal, the master switch traveler terminal, the master switch neutral terminal, and the master switch ground terminal respectively, the electrical power output is connected through the three-wire electrical cable to the master switch second live terminal, the master switch neutral terminal, and the master switch ground terminal respectively.

4. The intelligent multi-way master switch according to claim 3, wherein the DC power supply comprises: a live wire terminal connected to a live wire of the electrical power input, and a neutral wire terminal connected to a neutral wire of the electrical power input, and a low voltage DC output terminal, wherein the low voltage DC output terminal provides the low DC voltage to the live wire relay and the local switch control unit for the operation of the intelligent multi-way master switch.

5. The intelligent multi-way master switch according to claim 4, wherein the local switch control unit comprises:

a push button switch;

a Wi-Fi controlled switch;

a light sensor switch;

a motion sensor switch;

a touch panel switch; and any combination thereof.

6. The intelligent multi-way master switch according to claim 5, wherein the local switch control unit comprises: a switch control unit first terminal and a switch control unit second terminal, and the switch control unit first terminal is connected to the low voltage DC output terminal, wherein when the local switch control unit receives the one or more switch control instructions, the local switch control unit generates the negative pulse at the switch control unit first terminal.

7. The intelligent multi-way master switch according to claim 6, wherein the live wire relay comprises: DC control terminals having a positive DC control terminal and a negative DC control terminal, and live wire switch terminals having a first live wire terminal and a second live wire terminal, wherein when the live wire relay is in an “ON” state, the first live wire terminal and the second live wire terminal are connected, and when the live wire relay is in an “OFF” state, the first live wire terminal and the second live wire terminal are disconnected.

8. The intelligent multi-way master switch according to claim 7, wherein when the local switch control unit receives the one or more switch control instructions, and the negative pulse at the switch control unit first terminal is generated, the live wire relay detects the negative pulse generated and changes the state, when the live wire relay is in the “ON” state, the first live wire terminal and the second live wire terminal are disconnected, and when the live wire relay is in the “OFF” state, the first live wire terminal and the second live wire terminal are connected.

9. An intelligent multi-way slave switch, comprising:

a slave switch first live terminal, a slave switch second live terminal, a slave switch traveler terminal, a slave switch neutral terminal, and a slave switch ground terminal; and a remote switch control unit, wherein the remote switch control unit comprises: a switch control unit first terminal and a switch control unit second terminal, wherein the switch control unit first terminal is connected to the slave switch traveler terminal to receive a low voltage DC power supply, wherein when the remote switch control unit receives one or more switch control instructions, the remote switch control unit generates a negative pulse at the switch control unit first terminal and the negative pulse is sent to an intelligent multi-way master switch to turn “ON” or “OFF” an electrical power supply through the slave switch traveler terminal.

10. The intelligent multi-way slave switch according to claim 9, wherein when an electrical power input is connected through a three-wire electrical cable to the slave switch first live terminal, the slave switch neutral terminal, and the slave switch ground terminal respectively, an electrical power output is connected through a four-wire electrical cable to the slave switch second live terminal, the slave switch traveler terminal, the slave switch neutral terminal, and the slave switch ground terminal respectively.

11. The intelligent multi-way slave switch according to claim 10, wherein when the electrical power input is connected through the four-wire electrical cable to the slave switch second live terminal, the slave switch traveler terminal, the slave switch neutral terminal, and the slave switch ground terminal respectively, the electrical power output is connected through the three-wire electrical cable to the slave switch first live terminal, the slave switch neutral terminal, and the slave switch ground terminal respectively.

12. The intelligent multi-way slave switch according to claim 9, wherein the remote switch control unit comprises:

a push button switch;

a Wi-Fi controlled switch;

a light sensor switch;

a motion sensor switch;

a touch panel switch; and any combination thereof.

13. An intelligent multi-way switch system, comprising:

an intelligent multi-way master switch, wherein the intelligent multi-way master switch comprises: a master switch first live terminal, a master switch second live terminal, a master switch traveler terminal, a master switch neutral terminal, a master switch ground terminal, a direct current (DC) power supply, a live wire relay, a local switch control unit, and a live input terminal selector;

a plurality of intelligent multi-way slave switches, wherein each of the plurality of intelligent multi-way slave switches comprises: a slave switch first live terminal, a slave switch second live terminal, a slave switch traveler terminal, a slave switch neutral terminal, a slave switch ground terminal, and a remote switch control unit; and a load, wherein the load comprises a load live terminal, a load neutral terminal, and a load ground terminal, and the intelligent multi-way switch system controls an electrical power to the load, wherein the intelligent multi-way master switch, the plurality of intelligent multi-way slave switches, and the load are connected in serial, and the DC power supply provides DC power to the live wire relay, the local switch control unit of the intelligent multi-way master switch, and the remote switch control units of the plurality of intelligent multi-way slave switches for an operation of the intelligent multi-way switch system.

14. The intelligent multi-way switch system according to claim 13, wherein the intelligent multi-way master switch connects to an electrical power input through a three-wire electrical cable; the plurality of intelligent multi-way slave switches connects to the intelligent multi-way master switch through a four-wire electrical cable; and the load connects to the last intelligent multi-way slave switches of the plurality of intelligent multi-way slave switches through the three-wire electrical cable.

15. The intelligent multi-way switch system according to claim 13, wherein a first intelligent multi-way slave switch connects to an electrical power input through the three-wire electrical cable; the intelligent multi-way master switch connects to the rest of the plurality of intelligent multi-way slave switches through a four-wire electrical cable; and the load connects to the intelligent multi-way master switch through the three-wire electrical cable.

16. The intelligent multi-way switch system according to claim 13, wherein a first intelligent multi-way slave switch connects to an electrical power input through the three-wire electrical cable; the intelligent multi-way master switch connects to one or more intelligent multi-way slave switches through a four-wire electrical cable; the one or more intelligent multi-way slave switches connects to the intelligent multi-way master switch through the four-wire electrical cable, and the load connects to the last of the one or more intelligent multi-way slave switches through the three-wire electrical cable.

17. The intelligent multi-way switch system according to claim 13, wherein the DC power supply comprises: a live wire terminal connected to a live wire of an electrical power input, and a neutral wire terminal connected to neutral wire of the electrical power input, and a low voltage DC output terminal, wherein the low voltage DC output terminal provides a low DC voltage to the live wire relay, the local switch control unit of the intelligent multi-way master switch, the remote switch control units of the plurality of intelligent multi-way slave switches for the operation of the intelligent multi-way switch system.

18. The intelligent multi-way switch system according to claim 13, wherein when at least one of the local switch control unit of the intelligent multi-way master switch and the remote switch control units of the plurality of intelligent multi-way slave switches receives one or more switch control instructions, the local switch control unit or the remote switch control unit that receives the one or more switch control instructions generates a negative pulse at a switch control unit first terminal, and the live wire relay detects the negative pulse generated at the switch control unit first terminal and turns "ON" or "OFF" the electrical power to the load.

19. The intelligent multi-way switch system according to claim 18, wherein the live wire relay comprises: DC control terminals having a positive DC control terminal and a negative DC control terminal, and live wire switch terminals having a first live wire terminal and a second live wire terminal, wherein when the live wire relay is in an "ON" state, the first live wire terminal and the second live wire terminal are connected, and when the live wire relay is in an "OFF" state, the first live wire terminal and the second live wire terminal are disconnected.

20. The intelligent multi-way switch system according to claim 19, wherein when at least one of the local switch control unit of the intelligent multi-way master switch and the remote switch control units of the plurality of intelligent multi-way slave switches receives the one or more switch control instructions, and the negative pulse at the switch control unit first terminal is generated, the live wire relay detects the negative pulse generated and changes the state, when the live wire relay is in the "ON" state, the first live wire terminal and the second live wire terminal are disconnected, and when the live wire relay is in the "OFF" state, the first live wire terminal and the second live wire terminal are connected.

* * * * *